United States Patent [19]

Kathawala

[11] 3,896,143

[45] July 22, 1975

[54] SUBSTITUTED PYRAZOLYL PHENYLACETIC ACID DERIVATIVES

[75] Inventor: Faizulla G. Kathawala, West Orange, N.J.

[73] Assignee: Sandoz, Inc., E. Hanover, N.J.

[22] Filed: Oct. 18, 1972

[21] Appl. No.: 298,604

[52] U.S. Cl....... 260/310 D; 260/293.7; 260/310 R; 424/267; 424/273
[51] Int. Cl............................................ C07d 49/10
[58] Field of Search................................ 260/310 D

[56] References Cited
OTHER PUBLICATIONS

Neth. Appl. 6,605,317 – from C. A. 66: 77270h (1967).

Primary Examiner—Henry R. Jiles
Assistant Examiner—C. M. S. Jaisle
Attorney, Agent, or Firm—Gerald D. Sharkin; Richard E. Vila; Joseph J. Borovian

[57] ABSTRACT

Substituted pyrazolyl phenylacetic acid derivatives, e.g. 2-pyrazolin-3-yl and pyrazol-3-yl-phenyl acetic acids and phenyl acetamides are prepared by reacting a crotonoyl or cinnamoyl phenylacetic acid derivative with a substituted hydrazine and are useful by reason of their pharmacological activity in animals, e.g. as anti-inflammatories.

6 Claims, No Drawings

SUBSTITUTED PYRAZOLYL PHENYLACETIC ACID DERIVATIVES

This application relates to novel substituted pyrazolyl phenylacetic acid derivatives which are useful as anti-inflammatories. In particular, it relates to 1,5-disubstituted pyrazolyl phenylacetic acids and esters and phenyl acetamides, their preparation and use.

The compounds of this invention may be represented by the formula

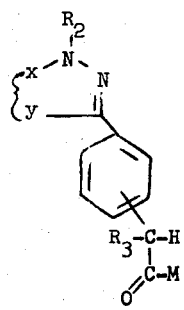

(I)

wherein  is $-CH-CH_2-$ or $-C=CH-$ $R_1$ is alkyl of 1 to 5 carbon atoms, phenyl or monosubstituted phenyl in which the substituent is halo, of atomic weight 19 to 80, alkyl of 1 to 3 carbon atoms, alkoxy of 1 to 3 carbon atoms or trifluoromethyl, $R_2$ is alkyl of 1 to 5 carbon atoms, cycloalkyl of 3 to 7 carbon atoms, phenyl or monosubstituted cycloalkyl or phenyl in which the substituent is halo of atomic weight 19 to 80, alkyl of 1 to 3 carbon atoms, alkoxy of 1 to 3 carbon atoms or trifluoromethyl $R_3$ is hydrogen or alkyl of 1 to 5 carbon atoms, M is hydroxy, alkoxy of 1 to 5 carbon atoms or

R' and R" are, independently, hydrogen or alkyl of 1 to 3 carbon atoms or R' and R" together with N form a saturated heterocyclic ring of 3 to 7 ring members in which one ring member is the N atom and the balance are carbon atoms, e.g. pyrrolidinyl and piperidino, and the carbon attached to the phenyl ring is attached at the para or meta position of said phenyl ring with respect to the pyrazolyl group, preferably the para position, and their pharmaceutically acceptable salts, e.g. alkali metal salts The compounds of formula I in which

 is $-CH-CH_2-$, i.e. the compounds of the formula

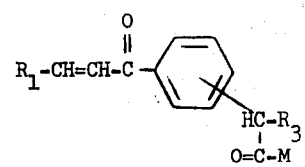

(Ia)

wherein $R_1$, $R_2$, $R_3$ and M are defined above can be prepared by reacting a compound of the formula

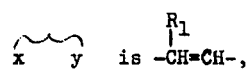

II wherein $R_1$, $R_3$ and M are as defined above, with a compound of the formula $$HN-NH_2 \quad \text{III}$$
$$\overset{R_2}{|}$$

wherein $R_2$ is as defined above.

The rotation of compounds II and III is carried out at a temperature of 15° to 120°C., preferably between room temperature and the reflux temperature of the reaction system, for a period ranging from about 1 to about 18 hours. An excess of the hydrazine III is preferably employed. The reaction is preferably carried out in the presence of a suitable solvent such as an alcohol, preferably ethanol.

The product can be separated from the reaction mixture by conventional methods.

The compounds of formula I in which

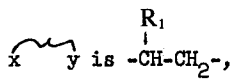 is $-CH=CH-$, i.e., the compound of the formula

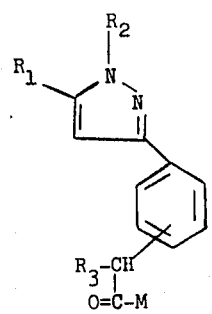

(Ib)

wherein $R_1$, $R_2$, $R_3$ and M are as defined above, can be prepared by dehydrogenating a compound of formula Ia.

The usual dehydrogenating agents can be used, including dichlorodicyanobenzoquinone, chloranil, palladium on carbon and sulfur in an inert solvent. An excess of the hydrogenating agent is preferably employed. The reaction is carried out in the presence of a solvent of conventional type for the reaction, e.g. an acyclic or cyclic ether such as dioxane, conveniently at room temperature, although temperatures ranging from about 15° to about 140°C. can be used.

The compounds of formulae II and III used in the preparation of compounds Ia are known, per se, or can be produced from known materials using conventional techniques. Belgian Patent 644,711, reported in Chemical Astract 63 14769 (1965), discloses one method for making compounds of formula II, while another method is disclosed hereinafter as Example A.

The compounds of the formula I form salts and the pharmaceutically acceptable salts thereof are included within the scope of the present invention. Such salts forming pharmaceutically acceptable compounds of the formula I include, e.g. the sodium salt and the triethyl ammonium salt. In general, the salts may be produced from the free acids by established procedures. Conversely, the free acids may be obtained from the salts by well-known procedures.

The compounds of formula I and their pharmaceutically acceptable salts are useful because they exhibit pharmacological activity in animals such as mammals, particularly anti-inflammatory activity, as indicated by plethysographic measurement of foot volumes of mature Lewis strain rats made arthritic by a single 0.1 ml. injection of complete Freunds Adjuvant and dosed orally for 14 days with the compound of formula I at a daily dosage rate of 10 to 150 mg./kg. For such use, the compounds may be combined with a pharmaceutically acceptable carrier and such other conventional adjuvants as may be necessary and administered orally in such forms as tablets, capsules, elixers, suspensions and the like or parenterally in the form of an injectable solution or suspension.

The dosage of active ingredient employed may vary depending on the particular compound employed, the method of administration and the severity of the condition being treated. However, in general, satisfactory results are obtained when the compounds(I) are administered orally at a daily dosage of from about 1 milligram to about 200 milligrams per kilogram of animal body weight, given as a single dose or in divided doses, two to four times a day, or in sustained release forms. For most large mammals, the total daily dosage is from about 75 to about 3,000 milligrams. Dosage forms suitable for internal use comprise from about 20 to about 1,500 milligrams of the active compound in intimate admixture with a solid or liquid pharmaceutically acceptable carrier or diluent.

The compounds of formula I may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweeteners, flavorants, colorants and preservatives. Tablets may contain the active ingredient in admixture with conventional pharmaceutically acceptable excipients, e.g., inert diluents, such as calcium phosphate, terra alba, lactose and talc, granulating and disintegrating agents, e.g., starch and alginic acid, binding agents, e.g., starch, gelatin, polyvinyl pyrrolidone and acacia, and lubricating agents, e.g., magnesium stearate, stearic acid and talc. The tablets may be undercoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragcanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium phosphate and kaolin. The sterile injectable compositions are formulated are known in the art and may contain appropriate dispersing or wetting agents and suspending agents identical or similar to those mentioned above. These pharmaceutical preparations may contain 1% up to about 90% preferably 3 to 50% of the active ingredient in combination with the carrier or adjuvant.

The preferred pharmaceutical compositions from the standpoint of preparation and ease of administration are solid compositions particularly hard-filled capsules and tablets.

Tablets and capsules containing the ingredients indicated below may be prepared by conventional techniques and are useful in treating inflammation at a dose of one tablet or capsule 2 to 4 times a day.

| Ingredients | Weight (mg.) Tablet | Capsule |
|---|---|---|
| p-(1-methyl-5-phenyl-2-pyrazolin-3-yl)-phenylacetic acid | 100 | 100 |
| tragacanth | 10 | — |
| lactose | 147.5 | 200 |
| corn starch | 25 | — |
| talcum | 15 | — |
| magnesium stearate | 2.5 | — |
| Total | 300.0 mg. | 300.0 mg. |

The following pharmaceutical compositions are formulated with the indicated amount of active agent using conventional techniques. The injectable solution and the oral liquid solution represent formulations useful in the treatment of inflammation:

| | Injectable Weight % | Liquid Weight % |
|---|---|---|
| p-(1-methyl-5-phenyl-2-pyrazolin-3-yl)-phenylacetic acid | 10 | 0.5 to 3.5 |
| sodium alginate | 0.5 | — |
| sodium benzoate | — | 0.1 to 0.5 |
| simple syrup | — | 30 to 70 |
| lecithin | 0.5 | — |
| sodium chloride | as desired | — |
| flavor | — | as desired |
| color | — | as desired |
| sorbitol solution 70% USP | — | 10 to 30 |
| buffer agent to adjust pH for desired stability | as desired | as desired |
| water | to desired volume | to desired volume |

EXAMPLE A p-Cinammoylphenylacetic acid

A solution of 4.5g 4-acetyl phenylacetic acid, 2.78g benzaldehyde and 2.38g sodium hydroxide in 212ml water and 13ml ethanol is stirred overnight at room temperature, then washed with chloroform. The aqueous layer is added dropwise to 200ml 2N HCl and filtered to yield as residue the title product.

The 4-acetyl phenylacetic acid can be prepared using the procedure of D. Papa et al. *J. Am. Chem. Soc.* 60 2133 (1946).

EXAMPLE 1 p-(1-methyl-5-phenyl-2-pyrazolin-3-yl)-phenyl acid

Three hundred seventy milligrams of methyl hydrazine are added to a suspension of 1.3g. p-cinnamoylphenylacetic acid in 20 cc ethanol at room temperature. The resulting solution is stirred overnight at room temperature. It is then evaporated in vacuo at 55°C to an oil. The product is extracted with ethyl acetate, washed with water and with sodium chloride solution, dried and recrystallized from ether at 0°C to yield the title product m.p. 125°–128°C.

EXAMPLE 2 p-(1,5,diphenyl-2-pyrazolin-3-yl)-N,N-dimethyl-phenylacetamide

A solution of 10g. p-cinnamoylphenylacetic acid in 50cc $SOCl_2$ is refluxed for 1 hour and evaporated in vacuo. The resulting crude acid chloride is dissolved in 50cc anhydrous benzene and slowly dropped into a saturated solution of dimethylamine in methanol at icebath temperature. The resulting mixture is stirred overnight at room temperature. The resulting clear solution is evaporated to an oil, extracted with ethyl acetate and washed with water and with sodium chloride solution to yield p-cinnamoyl-N,N-dimethyl-phenyl acetamide.

To a warm solution of 68g. of the thus prepared phenylacetamide compound in 2.0 liters ethanol is added 399 phenyl hydrazine. The resulting solution is refluxed for 3 hours and then allowed to stand overnight at room temperature with stirring. It is then evaporated to an orange oil, dissolved in ethyl acetate and allowed to stand overnight at 0°–4°C. Separation of the resulting crystals from the mother liquor and recrystallization yields the title product m.p. 176°–178°C.

EXAMPLE 3 p-(1,5-diphenyl-pyrazolin-3-yl)-phenylacetamide

To a suspension of 62g p-cinnamoylphenylacetamide in 2.5 l. ethanol are added 37.4g. phenyl hydrazine. The resulting mixture is refluxed for 3 hours. The resulting solution is cooled, concentrated to crystalline form and recrystallized from ethanol chloroform to yield the title product, m.p. 215°–217°C.

EXAMPLE 4 p-(1,5-diphenyl-pyrazolin-3-yl)-phenylacetic acid

Twenty four grams of phenylhydrazine are added to a solution of 39g p-cinnamoylphenylacetic acid in 1.5 l ethanol at room temperature. The resulting mixture is stirred overnight at room temperature with formation of a yellow solution. Evaporation of this solution to a foam and working up as in Example 1 yields the title compound, m.p. > 208°C.

EXAMPLE 5 p-(1-methyl-5-pyrazol-3-yl)phenylacetic acid

To a solution of 9.4g of p-(1-methyl-5-phenyl-2-pyrazolin-3-yl)-phenylacetic acid, prepared as in Example 1, in 200 cc dioxane is added 8.0g. dichlorodicyanobenzoquinone. The resulting solution is stirred at room temperature overnight, filtered and the filtrate concentrated to an oil. The oil is recrystallized from methanol-ether, then from dichloromethane-ether to yield the title compound m.p. 148°–155°C.

EXAMPLES 6–8

In a manner similar to that of Example 5, the products of Examples 2 to 4 are reacted with dichlorodicyanobenzoquinone and recrystallized to yield, respectively:

p-(1,5-diphenyl-pyrazol-3-yl)-N,N-dimethyl-phenylacetamide, m.p. 152°–154°C.;

p-(1,5-diphenyl-pyrazol-3-yl)-phenylacetamide, m.p. 103°–104°C;

p-(1,5-diphenyl-pyrazol-3-yl)phenyl acetic acid, m.p. 155°–160°C.

What is claimed is:

1. A compound of the formula

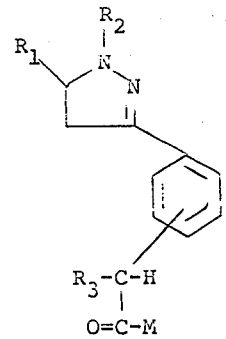

wherein $R_1$ is alkyl of 1 to 5 carbon atoms, phenyl or monosubstituted phenyl in which the substituent is halo of atomic weight 19 to 80, alkyl of 1 to 3 carbon atoms, alkoxy of 1 to 3 carbon atoms or trifluoromethyl, $R_2$ is alkyl of 1 to 5 carbon atoms, cycloalkyl of 3 to 7 carbon atoms, phenyl or monosubstituted cycloalkyl or phenyl in which the substituent is halo of atomic weight 19 to 80, alkyl of 1 to 3 carbon atoms, alkoxy of 1 to 3 carbon atoms or trifluoromethyl, $R_3$ is hydrogen or alkyl of 1 to 5 carbon atoms, M is hydroxy, alkoxy of 1 to 5 carbon atoms or

wherein

R' and R" are, independently, hydrogen or alkyl of 1 to 3 carbon atoms, and the carbon attached to the phenyl ring is attached to the para- or meta- position of said phenyl ring with respect to the pyrazolyl group, and their pharmaceutically acceptable salts.

2. A compound of claim 1 wherein
R₁ and R₂ are independently alkyl of 1 to 3 carbon atoms or phenyl
R₃ is hydrogen, and
M is hydroxy, alkoxy of 1 to 3 carbon atoms or

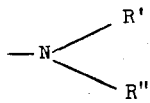

wherein
R' and R'' are independently hydrogen or alkyl of 1 to 3 carbon atoms.
3. A compound of claim 2 wherein the carbon atom bearing the group R₃ is attached at the para position.
4. The compound of claim 1 having the formula

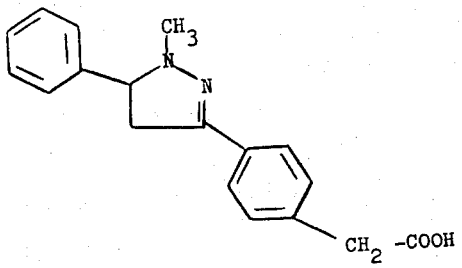

5. A compound of claim 1 wherein M is hydroxy or alkoxy of 1 to 5 carbon atoms.
6. A compound according to claim 5 wherein M is hydroxy.

* * * * *